United States Patent
Hoppe et al.

(10) Patent No.: US 9,409,471 B2
(45) Date of Patent: Aug. 9, 2016

(54) VEHICLE AND METHOD FOR MOUNTING A DRIVE ASSEMBLY

(75) Inventors: Tobias Hoppe, Kassel (DE); Achim Landgrebe, Kassel (DE)

(73) Assignee: KRAUSS-MAFFEI WEGMANN GMBH & CO. KG, Munich (DE)

( * ) Notice: Subject to any disclaimer, the term of this patent is extended or adjusted under 35 U.S.C. 154(b) by 16 days.

(21) Appl. No.: 14/131,662

(22) PCT Filed: Jul. 3, 2012

(86) PCT No.: PCT/DE2012/100197
§ 371 (c)(1),
(2), (4) Date: Feb. 14, 2014

(87) PCT Pub. No.: WO2013/007249
PCT Pub. Date: Jan. 17, 2013

(65) Prior Publication Data
US 2014/0151142 A1    Jun. 5, 2014

(30) Foreign Application Priority Data
Jul. 8, 2011  (DE) .......................... 10 2011 051 687

(51) Int. Cl.
*B60K 5/00* (2006.01)
*F41H 7/04* (2006.01)
(Continued)

(52) U.S. Cl.
CPC . *B60K 5/00* (2013.01); *B62D 21/11* (2013.01); *F41H 7/048* (2013.01); *B62D 65/10* (2013.01); *Y10T 29/49229* (2015.01)

(58) Field of Classification Search
CPC .............. B60K 5/00; B60K 5/08; B60K 5/12; B60K 5/1208; B60K 5/1216; B60K 5/1233; B60K 5/1283; B60K 6/00; B60K 6/20; B60K 6/52; B60K 7/00; B60K 2007/0038; B60K 2007/0092; B60G 2206/60; B62D 21/00; B62D 21/02; B62D 21/12; B62D 21/18; B62D 21/11; B62D 24/00; B62D 25/00; B62D 25/08; B62D 25/082; B62D 23/00; B62D 23/005; B62D 25/085; F41H 7/00; F41H 7/048
USPC .......... 180/291, 311, 312, 89.1; 280/781, 785
See application file for complete search history.

(56) References Cited

U.S. PATENT DOCUMENTS 3,115,945 A * 12/1963 Dry .......................... B60G 9/00
                                                    105/106
4,040,640 A *  8/1977 Begg ............................. 180/292
(Continued)

FOREIGN PATENT DOCUMENTS

DE      19860794      7/2000
DE      10045749      3/2001
(Continued)

OTHER PUBLICATIONS

PCT, International Search Report; International Patent Application No. PCT/DE2012/100197 (Nov. 10, 2012).

Primary Examiner — James M Dolak
(74) Attorney, Agent, or Firm — Thompson Hine LLP

(57) ABSTRACT

A vehicle, in particular, a military vehicle, includes a self-supporting vehicle body (2) and a drive assembly (3) for driving the vehicle. The drive assembly (3) is connected to the vehicle body (2) via an assembly support (6, 7), the assembly support (6, 7) forming a part of the support structure of the vehicle body (2). In a method for mounting a drive assembly (3) in a vehicle (2) that has a self-supporting vehicle body (2), the drive assembly (3) is connected to the vehicle body (2) via an assembly support (6, 7) and the assembly support (6, 7) forms a part of the support structure of the vehicle body (2) in the mounted state.

14 Claims, 8 Drawing Sheets

(51) Int. Cl.
*B62D 21/11* (2006.01)
*B62D 65/10* (2006.01)

(56) References Cited

U.S. PATENT DOCUMENTS

| | | | | |
|---|---|---|---|---|
| 4,560,027 | A * | 12/1985 | Murakami | B60K 5/12 |
| | | | | 180/291 |
| 4,648,476 | A * | 3/1987 | Roe et al. | 180/297 |
| 4,881,756 | A * | 11/1989 | Kumasaka et al. | 280/785 |
| 4,958,584 | A | 9/1990 | Williamson | |
| 5,882,064 | A * | 3/1999 | Emmons | B62D 21/09 |
| | | | | 280/781 |
| 6,269,902 | B1 * | 8/2001 | Miyagawa | 180/312 |
| 6,408,974 | B1 * | 6/2002 | Viduya | B62D 21/00 |
| | | | | 180/312 |
| 6,564,892 | B2 * | 5/2003 | Wooldridge et al. | 180/68.4 |
| 6,685,203 | B1 * | 2/2004 | Bodin et al. | 280/124.109 |
| 6,736,232 | B1 * | 5/2004 | Bergstrom et al. | 180/292 |
| 6,755,461 | B2 * | 6/2004 | Seksaria | B60K 5/12 |
| | | | | 296/193.04 |
| 6,786,295 | B2 * | 9/2004 | Herrmann et al. | 180/312 |
| 7,108,098 | B2 * | 9/2006 | Reese et al. | 180/299 |
| 7,163,076 | B2 * | 1/2007 | Seksaria et al. | 180/291 |
| 7,207,600 | B2 * | 4/2007 | Beckmann | B60G 7/02 |
| | | | | 180/311 |
| 7,490,691 | B2 * | 2/2009 | Reese et al. | 180/299 |
| 7,905,540 | B2 * | 3/2011 | Kiley | B62D 63/025 |
| | | | | 296/193.04 |
| 8,069,944 | B2 * | 12/2011 | Fell | 180/299 |
| 8,205,703 | B2 * | 6/2012 | Halliday | 180/89.1 |
| 8,397,856 | B2 * | 3/2013 | Gruen | B60K 5/1208 |
| | | | | 180/291 |
| 8,534,411 | B2 * | 9/2013 | Hirai | B60G 7/02 |
| | | | | 180/298 |
| 8,919,484 | B2 * | 12/2014 | Leopold | B60K 17/06 |
| | | | | 180/291 |
| 9,045,014 | B1 * | 6/2015 | Verhoff | F41H 5/16 |
| 9,211,914 | B2 * | 12/2015 | Murray | B62D 23/005 |
| 2006/0219462 | A1 * | 10/2006 | Martin | B62D 21/12 |
| | | | | 180/292 |
| 2010/0163330 | A1 | 7/2010 | Halliday | |

FOREIGN PATENT DOCUMENTS

| | | |
|---|---|---|
| EP | 0278479 | 8/1988 |
| FR | 2916528 | 11/2008 |

* cited by examiner

VEHICLE AND METHOD FOR MOUNTING A DRIVE ASSEMBLY

The instant application should be granted the priority dates of Jul. 8, 2011, the filing date of the corresponding German patent application 10 2011 051 687.5, as well as Jul. 3, 2012, the filing date of the International patent application PCT/DE2012/100197.

BACKGROUND

The invention relates to a vehicle, in particular, a military vehicle, with a self-supporting vehicle body and a drive assembly for driving the vehicle. A further subject matter of the invention is a method for mounting a drive assembly in a vehicle having a self-supporting vehicle body.

Modern vehicles frequently have a self-supporting vehicle body, in contrast to classical modes of frame construction, in which the supporting vehicle parts are formed from a frame comprising longitudinal and lateral supports. With self-supporting vehicle bodies, the support function is not provided by a separate frame, but assumed by the body components themselves, such as sheet metal, planking, reinforcements, and so on, which are often connected permanently to one another.

In the field of military vehicles, such types of self-supporting vehicle bodies are often also designated as vehicle hulls, in which, based on the desired high dimensions for cross-country mobility in the military field, particular specifications for the structural rigidity or stiffness of the vehicle are provided. For this reason, the vehicle bodies are reinforced via reinforcement elements arranged on the vehicle body or vehicle hull, which usually are connected with an increase of the weight of the vehicle hull. Further vehicle components then are mounted on the reinforced vehicle hull, such as the drive assembly of the vehicle, for example.

Typically, vehicle-fixed receiving points are provided on the vehicle body for mounting the drive assembly, via which the individual parts of the drive assembly can be connected with the vehicle body. The receiving points, however, have the disadvantage that they often are only difficult to access and require expensive mounting of the individual components of the drive assembly.

SUMMARY

The object of the present invention is to provide a connection between a drive assembly and a self-supporting body, which is distinguished by a simple mounting that requires only a few steps and permits an entirely light-weight structure of the vehicle.

This object is solved with a vehicle of the above-noted type, in which the drive assembly is connected via an assembly support with the vehicle body, whereby the assembly support forms a part of the support structure of the vehicle body.

By means of the connection of the assembly supports, the drive assembly can be connected with few movements as a premounted unit in a simple manner with the self-supporting vehicle body. In the mounted state, the assembly support forms a part of the support structure of the vehicle body, so that by mounting of the drive assembly, the rigidity of the vehicle body is significantly increased. The assembly support forms reinforcement elements of the vehicle body, so that additional reinforcement elements can be eliminated and thus, a lightweight structure can be achieved.

An advantageous embodiment contemplates that the drive assembly has a first drive module, in particular formed as a motor/gearbox unit, and a second drive module, formed in particular as a drive axle, which are connected via separate assembly supports to the vehicle body. The use of separate assembly supports for both drive modules permits a module mounting of the drive module in two working steps, whereby both drive modules can be connected coming from different directions with the vehicle body. In this regard, a two-fold reinforcement of the vehicle body is provided.

A further embodiment contemplates that an assembly support as a mounting unit with a first drive module is connected from above to the vehicle body and an assembly support as a mounting unit with the second drive module is connected from below to the vehicle body.

A further embodiment contemplates that the assembly supports, respectively, have a receiving area for receiving the drive module and a reinforcement region integrated in the support structure of the vehicle body. The respective drive module can be fixed on the receiving area. After mounting, the reinforcement area is integrated in the support structure of the vehicle body and reinforces it.

According to one embodiment of particular structural advantage, the reinforcement regions are formed from longitudinal and/or lateral supports that are integrated in the support structure of the vehicle body. The loads occurring when operating the vehicle can be distributed via the longitudinal or lateral supports, without excessive deformation of the vehicle body.

In this connection, it is further proposed that the reinforcement region of the first assembly support is formed by a lateral support extending above the receiving region. The load paths required for vehicle operation are completed via the lateral supports.

In addition, it is proposed that the reinforcement region of the second assembly support is formed from longitudinal and/or lateral supports extending beneath the receiving region. The load paths required for vehicle operation are completed via the longitudinal and/or lateral supports.

In a structural further embodiment, it is proposed that the reinforcement regions are connected via force- and form-locking joints in the support structure of the vehicle body, whereby a reliable reinforcement of the vehicle body is provided.

In addition, it is proposed as a solution for the above-stated object in a method of the type described above that the drive assembly is connected via an assembly support with the vehicle body and the assembly supports forms in the mounted state a part of the support structure of the vehicle body.

By using assembly supports, the drive assembly can be connected with few movements as a premounted unit in a simple manner with the self-supporting vehicle body. In the mounted state, the assembly support forms a part of the support structure of the vehicle body, so that rigidity required to receive the loads occurring during operation of the vehicle is achieved by mounting the drive assembly. The assembly supports form reinforcement elements of the vehicle body, so that additional reinforcement elements can be eliminated and therewith, a light-weight structure can be achieved.

In a further embodiment of the method, it is proposed that the drive assembly has a first drive module formed in particular as a motor/gearbox unit and a second drive module formed in particular as a drive axle, which are connected with the vehicle body via separate assembly supports.

Taking into consideration a simple mounting process, a further embodiment contemplates that first the assembly supports are connected with the vehicle body and next the drive modules are connected to one another.

Furthermore, it is proposed that an assembly support as a premounted mounting unit is connected to the vehicle body with the first drive module and an assembly supports as a premounted mounting unit is connected to the vehicle body with the second drive module. In this manner, the mounting expense upon insertion of the drive assembly made from two drive modules into the vehicle body is reduced.

It is advantageous from assembly-technology considerations that the assembly supports, respectively, have a receiving region for receiving the drive module and a reinforcement region, which is integrated into the support structure of the vehicle hull.

Finally, it is proposed that the reinforcement regions are connected via force- and form-locking joints into the support structure of the vehicle body, so that these can reliably absorb the loads occurring during vehicle operation.

BRIEF DESCRIPTION OF THE DRAWINGS

Further details and advantages of the invention will be explained next with reference to the accompanying drawings of an exemplary embodiment. In the figures.

DETAILED DESCRIPTION

Figure 1:
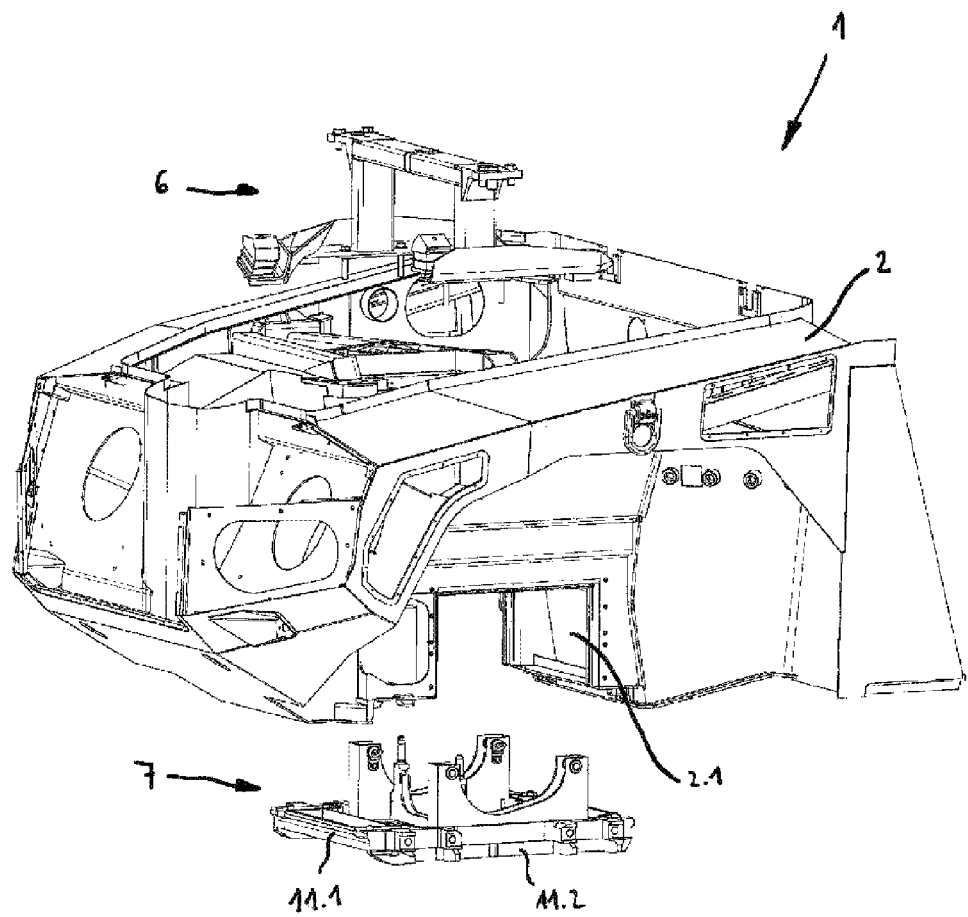
FIG. 1 shows in perspective view a part of a vehicle body with two assembly supports before mounting, whereby the drive module is not shown for reasons of clarity.

FIG. 1 shows in perspective view the front end of a vehicle 1 with a self-supporting vehicle body 2. The vehicle 1 is a military wheeled vehicle designed for travel in rough terrain with a vehicle body 2 protected against ballistic threats.

Figure 3:
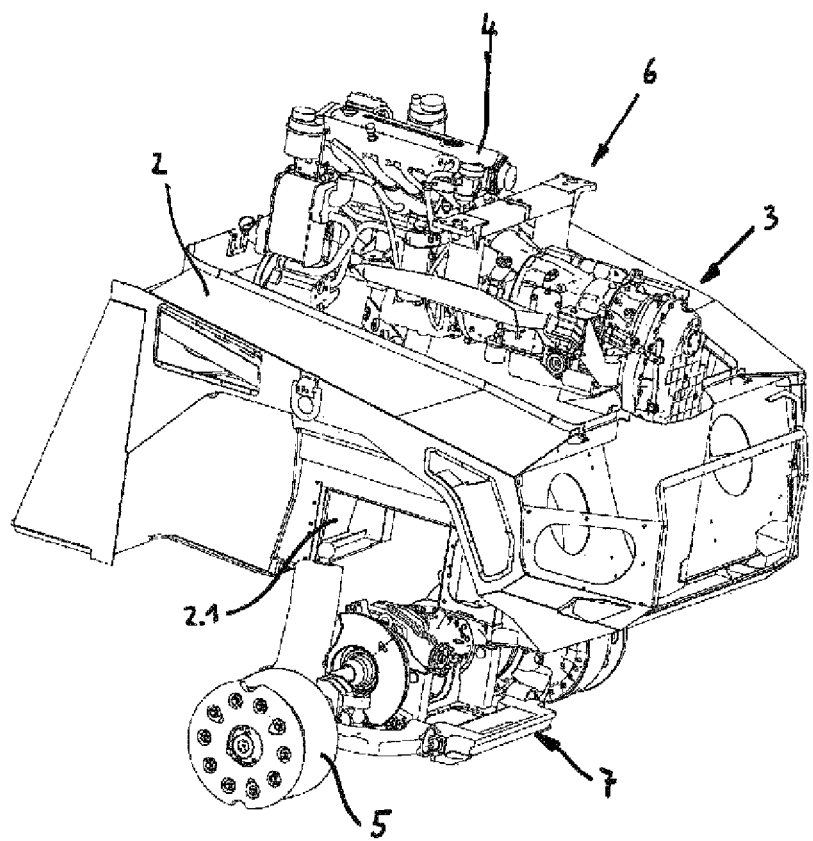
FIG. 3 shows a similar representation as that of FIG. 1 with the drive modules accommodated in the assembly supports.

The vehicle body 2 of the vehicle 1 is shown in FIG. 1 without a drive assembly 3, but the first and second assembly supports 6 and 7, respectively, that serve for mounting of the drive assembly 3 are shown. As can be seen in connection with FIG. 3, the drive assembly is made up of two drive modules 4, 5, for which, respectively, a separate assembly support 6, 7 is provided. The second assembly support 7 serves for receiving the second drive module 5, which comprises the actual drive train, made up of the differential, side gearbox, brake, undercarriage components, and so on. The drive module 4 and the drive module 5 commonly form the drive assembly 3 of the vehicle 1.

Mounting the drive module 4 to the self-supporting vehicle body 2 takes place via the first assembly support 6 from above. The mounting of the second assembly support 7 takes place from below in a corresponding receiving area of the vehicle body 2 formed as the vehicle hull.

Figure 2:
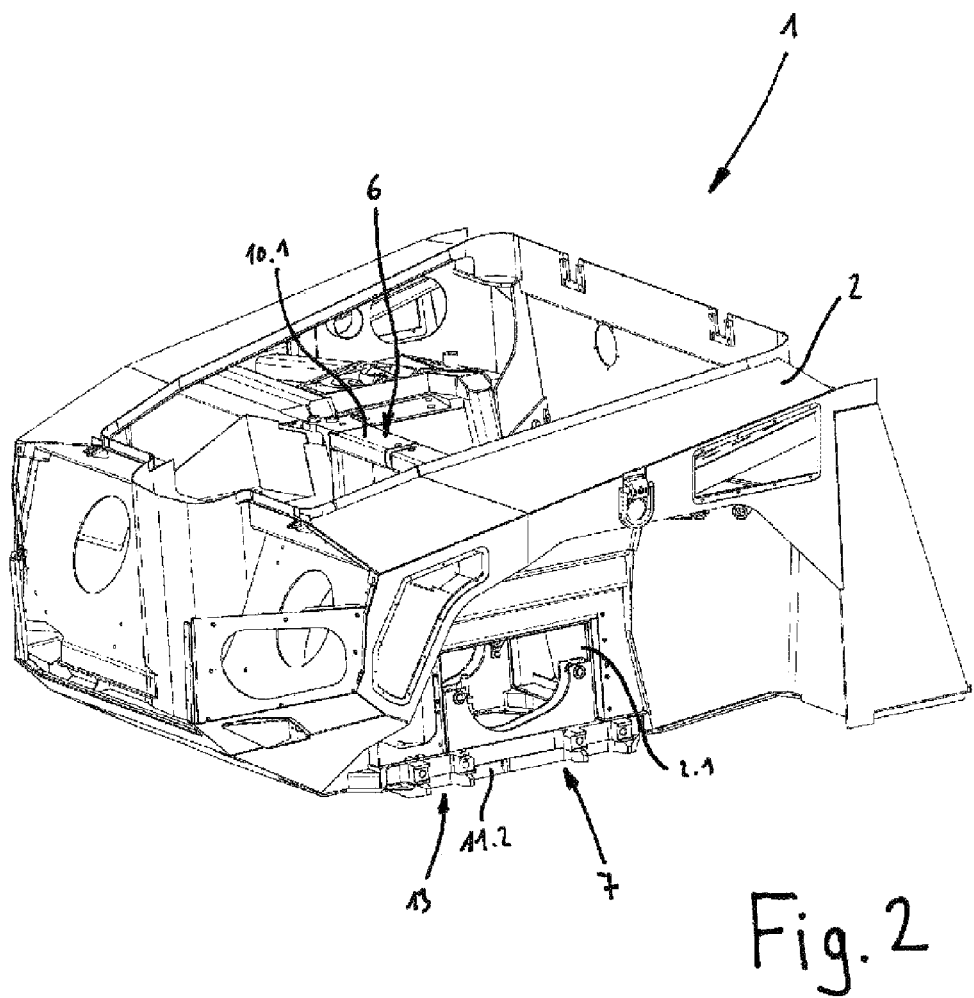
FIG. 2 shows a representation according to the representation of FIG. 1 with mounted assembly supports.
Figure 7:
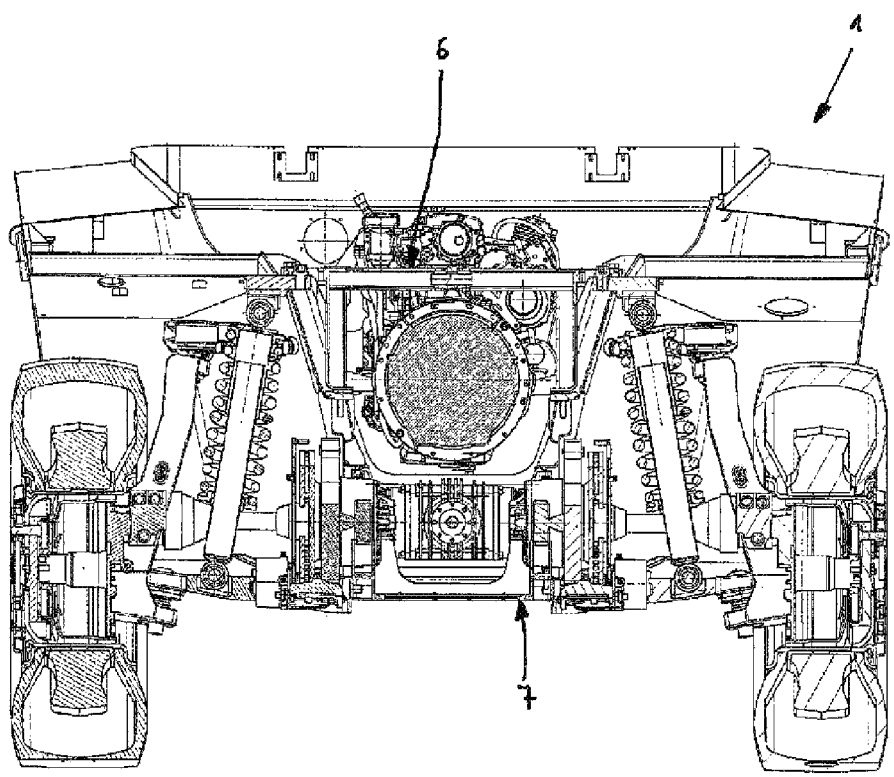
FIG. 7 shows a further sectional representation according to the representation of FIG. 6.
Figure 8:
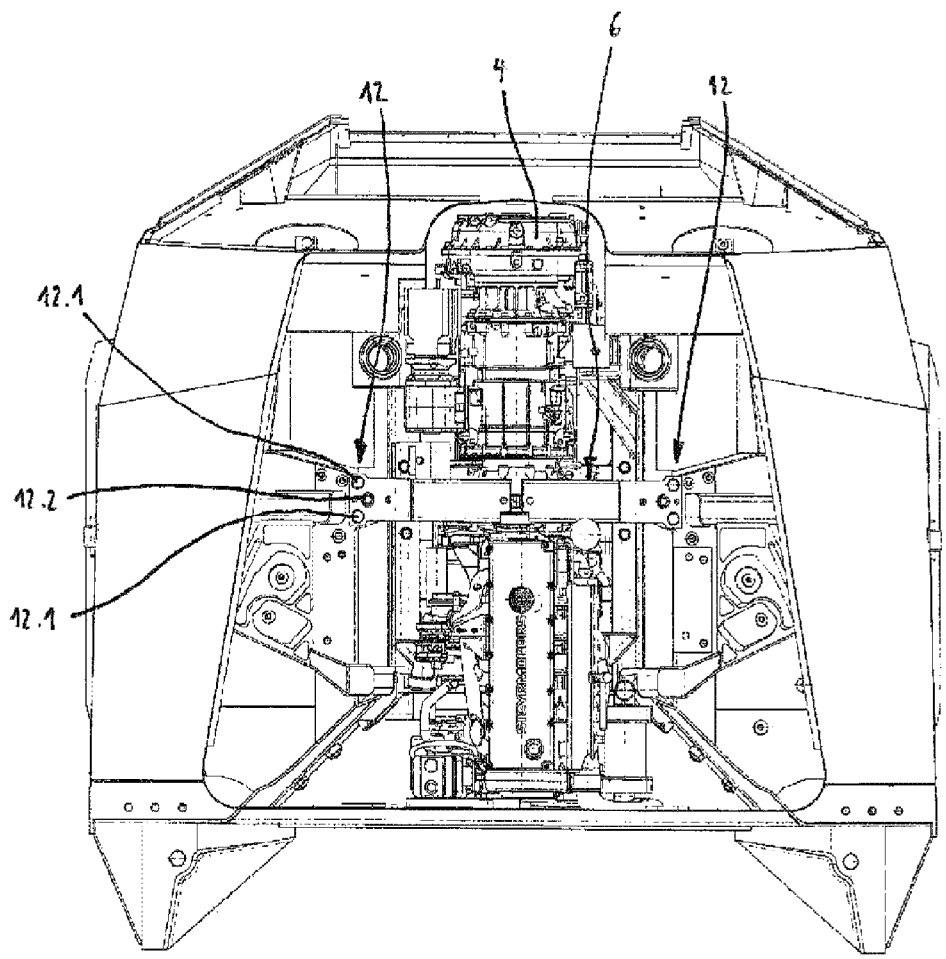
FIG. 8 shows a plan view of the front part of the vehicle body.
Figure 9:
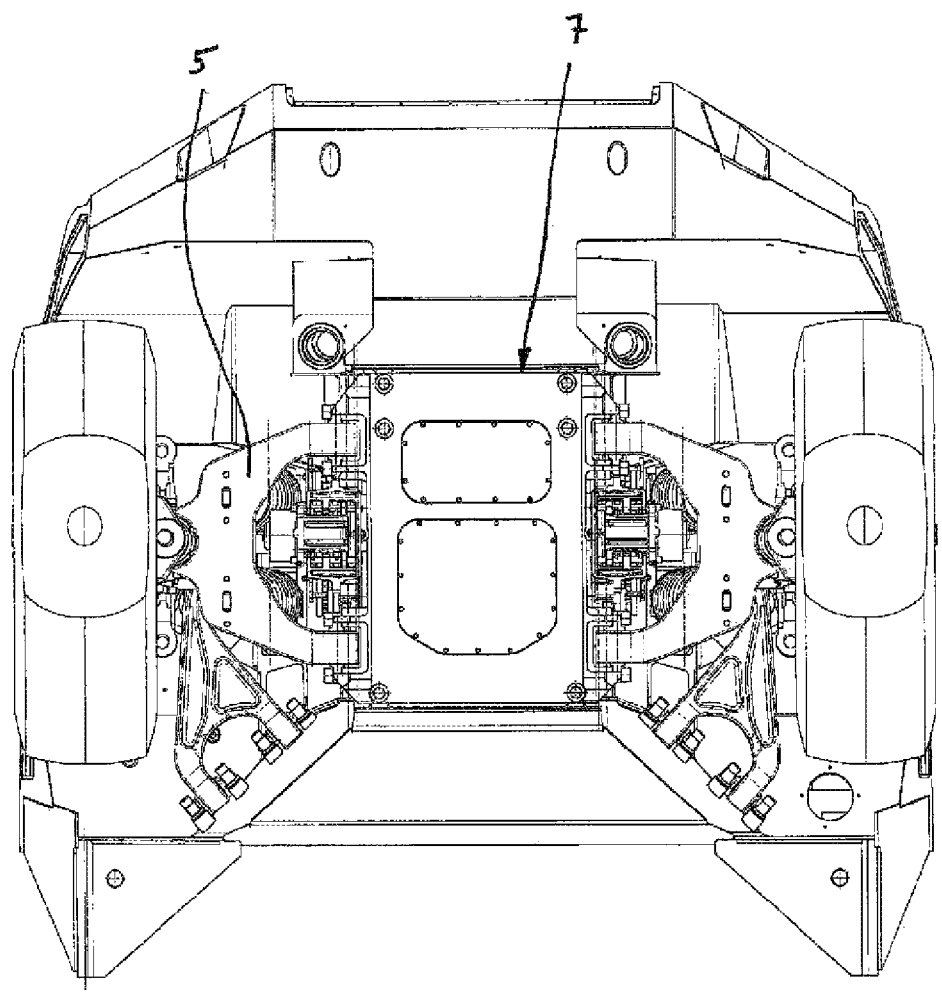
FIG. 9 shows a view of the front part of the vehicle body from below.

As can be seen in FIG. 2, the first and second assembly supports 6, 7 in the mounted state form a part of the support structure of the vehicle body 2 (compare also the representation in FIGS. 7 through 9). The second assembly supports 6 inserted from above in the engine chamber of the vehicle body 2 form a lateral reinforcement of the vehicle body 2 via a lateral support 10.1. The assembly support 7 inserted from below reinforces the vehicle body 2 via lateral support 11.1 as well as longitudinal support 11.2 in the lateral as well as in the longitudinal direction (compare also the representation in FIGS. 4 and 5). In the mounted position, the first and second assembly supports 6, 7 reinforce the vehicle body 2, such that loads from the vehicle body 2 occurring during operation of the vehicle can be absorbed without substantial deformation of the vehicle body 2.

Figure 4:
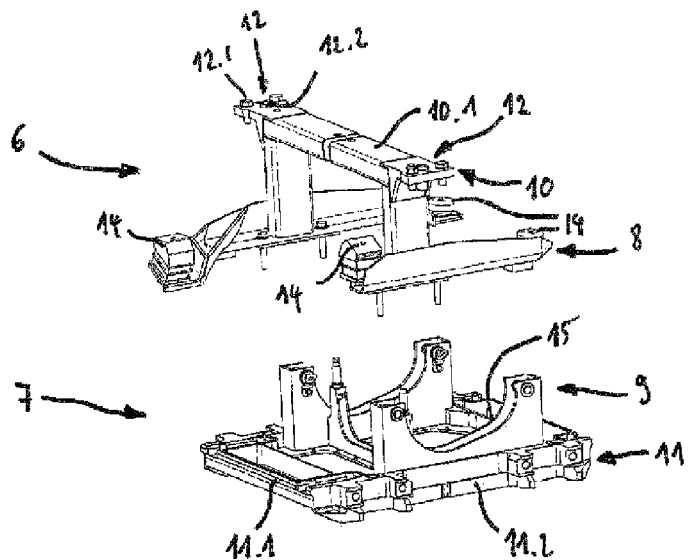
FIG. 4 shows a perspective representation of the assembly supports.
Figure 5:
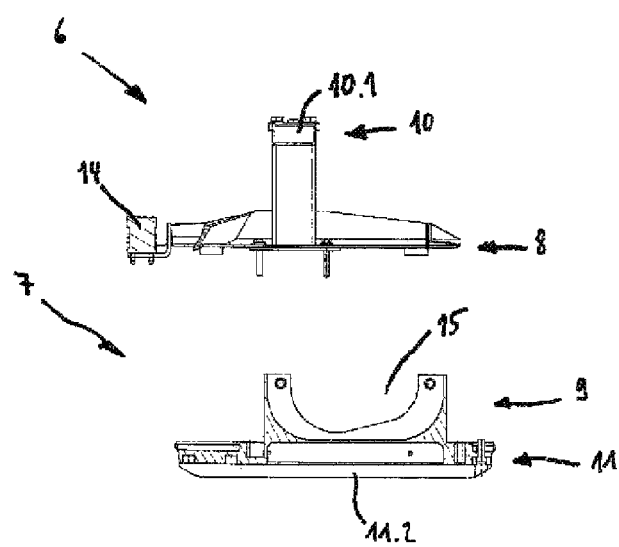
FIG. 5 shows a lateral view of the assembly supports.
Figure 6:
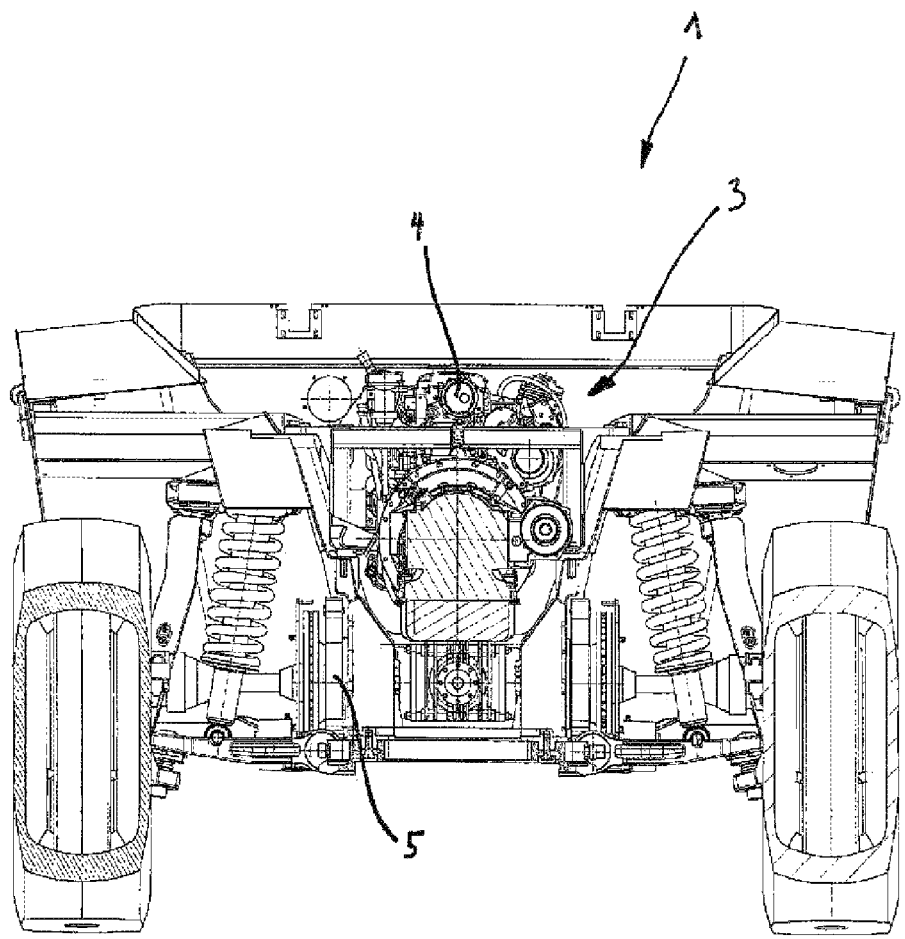
FIG. 6 shows a sectional view of a drive assembly connected with the vehicle body.

As can be seen from FIGS. 4 and 5, the first and second assembly supports 6, 7, each have a receiving region 8, 9 for receiving their respective drive module 4, 5.

When the first assembly support 6 receives the engine/gearbox unit, receipt of the corresponding drive module 4 takes place via elastic mounting points 14, which are arranged in a region of the receiving region 8 of the assembly support 6. The reinforcement region 10 of the first assembly support 6 can be seen above the receiving region 8, which is formed by a lateral support 10.1 extending in the transverse direction of the vehicle. In the mounted state, the lateral support 10.1 forms a lateral connection that reinforces the vehicle body 2 from a side of the engine chamber to the opposite side of the engine chamber. The connection between the assembly support 6 and the vehicle body 2 takes place via joints 12 provided on the lateral support 10.1. The joints 12 are formed from two respective stud bolts 12.1 as well as a form-locking tapered connection by means of a tapered region 12.2, so that a form-locking and a force-locking connection with the vehicle body 2 at the existing joints is provided (compare FIG. 8). Thus, the manufacturing tolerances can be compensated and the loads occurring during operation of the vehicle can be distributed reliably into the lateral support 10.1.

In contrast to the assembly support 6, the reinforcement region 11 second of the assembly support 7 is arranged beneath its receiving region 9. The receiving region 9 is formed from a recess 15 that is open upwardly, in which the second drive module 5 formed as a drive train can be inserted (see also FIG. 3). The receiving region 9 is inserted into a correspondingly formed opening 2.1 of the vehicle body 2 and is connected with it by screws as well as by form- or force-locking, whereby a joint 13 is provided. The reinforcement region 11 of the second assembly support 7 has a lateral support 11.1 as well as a longitudinal support 11.2, so that here, the joint connections of the vehicle body 2 are connected in the longitudinal and lateral direction.

After both assembly supports 6, 7 are inserted with the corresponding drive modules 4, 5 into the vehicle body 2 from above or below and connected to it, the vehicle body 2 has the necessary rigidity for vehicle operation. In the next step, both drive modules 4, 5, are connected to one another and the vehicle 1 can be put into operation.

The previously described vehicle 1 and the associated mounting method demonstrated a simple modular mounting capability of the drive assembly 3, whereby simultaneously, a reinforcement of the vehicle body 2 is achieved without any appreciable increase to its total weight, compared with common self-supporting vehicle bodies.

The specification incorporates by reference the disclosure of German patent application 10 2011 051 687.5, filed Jul. 8, 2011, as well as International application PCT/DE2012/100197, filed Jul. 3, 2012.

The present invention is, of course, in no way restricted to the specific disclosure of the specification and drawings, but also encompasses any modifications within the scope of the appended claims.

REFERENCE NUMERALS 1 vehicle
2 vehicle body
2.1 opening
3 drive assembly
4 drive module
5 drive module
6 assembly support
7 assembly support
8 receiving region
9 receiving region
10 reinforcement region
10.1 lateral support
11 reinforcement region
11.1 lateral support
11.2 longitudinal support
12 joint
12.1 stud bolt
12.2 tapered region
13 joint
14 mounting point

The invention claimed is:

1. A vehicle comprising:
a self-supporting vehicle body (2);
a drive assembly (3) for driving the vehicle;
a first assembly support (6) and a second assembly support (7) that connect the drive assembly (3) to the vehicle body and form a part of a support structure of the vehicle body (2);
the drive assembly (3) including a first drive module (4) formed as an engine/gearbox unit and a second drive module (5) formed as a drive train, which are connected via the first and the second assembly supports (6,7), respectively, to the self-supporting vehicle body (2); and
the first assembly support (6) having a first receiving region (8) for receiving the first drive module, and the second assembly support (7) having a second receiving region (9) for receiving the second drive module (5), the first assembly support and the second assembly support providing reinforcement regions (10, 11) integrated in the support structure of the vehicle body (2).

2. The vehicle according to claim 1, wherein the first assembly support (6) is connected to the vehicle body (2) as a mounting unit with the first drive module (4) from above the vehicle body, and the second assembly support (7) is connected to the vehicle body (2) as a mounting unit with the second drive module (5) from below the vehicle body (2).

3. The vehicle according to claim 1, wherein the reinforcement regions (10, 11) each include longitudinal supports and lateral supports (10.1, 11.1, 11.2) connected to reinforce the support structure of the self-supporting vehicle body (2).

4. The vehicle according to claim 1, wherein the reinforcement region (10) of the first assembly support (6) is formed by a lateral support extending above the receiving region.

5. The vehicle according to claim 1, wherein the reinforcement region (11) of the second assembly support (7) is selected from a longitudinal support and a lateral support (11.1, 11.2) extending beneath the receiving region (9).

6. The vehicle according to claim 1, wherein the reinforcement region (10) of the first assembly support is connected in the support structure of the vehicle body (2) via joints (12, 13).

7. A method for mounting a drive assembly (3) in a vehicle having a self-supporting vehicle body (2), the method comprising:
connecting a drive assembly (3) for driving the vehicle to the self-supporting vehicle body (2) via a first assembly support (6) and a second assembly support (7), wherein the first and the second assembly supports (6, 7) form in a mounted state a part of a support structure of the vehicle body (2); and
connecting a first drive module and a second drive module to the self-supporting vehicle body via the first and the second assembly supports, respectively, wherein the first drive module (4) is formed as an engine/gearbox unit, and the second drive module (5) is formed as a drive train;
wherein the first and the second assembly supports (6, 7) each have a receiving region (8, 9) for receiving the first and the second drive modules (4, 5), respectively, and a reinforcement region (10, 11), which is integrated into the support structure of the vehicle body (2).

8. The method according to claim 7, wherein connecting the drive assembly includes first, connecting the first and the second assembly supports (6, 7) to the vehicle body (2), and next, connecting the drive modules (4, 5) to one another.

9. The method according to claim 7, wherein connecting the drive assembly includes connecting the first assembly support (6) to the vehicle body (2) as a premounted mounting unit with the first drive module (4), and connecting the second assembly support (7) to the vehicle body (2) as premounted mounting units with the second drive module (5).

10. The method according to claim 9, wherein connecting the drive assembly includes connecting the first assembly support (6) to the vehicle body (2), and connecting the second assembly support (7) to the vehicle body (2) below the vehicle body.

11. The method according to claim 7, wherein connecting the drive assembly includes connecting the reinforcement regions (10, 11) of the first and the second assembly supports by stud bolts (12.1) to the support structure of the vehicle body (2).

12. The method according to claim 7, wherein connecting the drive assembly includes connecting a first lateral support (10.1) of the first drive module by joints (12) at ends of the first drive module to the vehicle body to form a lateral support of the vehicle body; and
connecting a second lateral support (11.1) of the second drive module to the vehicle body in a lateral direction to provide lateral support to the vehicle body, and connecting a longitudinal support (11.2) to the vehicle body in a longitudinal direction to provide longitudinal support to the vehicle body.

13. A vehicle comprising:
a self-supporting vehicle body (2);
a drive assembly (3) for driving the vehicle;
a first assembly support (6) and a second assembly support (7) that connect the drive assembly (3) to the vehicle body and form a part of a support structure of the vehicle body (2);
the drive assembly (3) including a first drive module (4) formed as an engine/gearbox unit and a second drive module (5) formed as a drive train, which are connected via the first and the second assembly supports (6,7), respectively, to the self-supporting vehicle body (2);

the first assembly support (6) having a first receiving region (8) for receiving the first drive module, and the second assembly support (7) having a second receiving region (9) for receiving the second drive module (5), the first assembly support and the second assembly support providing first and second reinforcement regions (10, 11), respectively, integrated in the support structure of the vehicle body (2); and the second receiving region (9) having an upwardly open recess (15) shaped to receive the second drive module, and the second receiving region is inserted into and connected to a correspondingly formed opening (2.1) in the vehicle body, thereby forming a joint (13).

14. The vehicle of claim 13, wherein the first drive module and the second drive module are connected to one another.

* * * * *